United States Patent [19]

Olschewski et al.

[11] 4,339,157

[45] Jul. 13, 1982

[54] LINEAR MOTION ROLLING BEARING

[75] Inventors: Armin Olschewski, Schweinfurt; Manfred Brandenstein, Eussenheim; Lothar Walter, Schweinfurt; Horst M. Ernst, Eltingshausen, all of Fed. Rep. of Germany

[73] Assignee: SKF Kugellagerfabriken GmbH, Schweinfurt, Fed. Rep. of Germany

[21] Appl. No.: 134,493

[22] Filed: Mar. 27, 1980

[30] Foreign Application Priority Data

Apr. 14, 1979 [DE] Fed. Rep. of Germany ... 7911040[U]

[51] Int. Cl.³ .............................................. F16C 29/06
[52] U.S. Cl. ................................................... 308/6 C
[58] Field of Search ................ 64/23.7; 308/6 R, 6 A, 308/6 B, 6 C, 187, 188, 237 R, 245

[56] References Cited

U.S. PATENT DOCUMENTS 4,239,299 12/1980 Hoffmann ........................ 308/6 C Primary Examiner—Frederick R. Schmidt
Attorney, Agent, or Firm—Daniel M. Rosen

[57] ABSTRACT

A linear motion rolling bearing including an outer sleeve, a cage within the sleeve for guiding rolling elements, a plurality of endless channels including axial races and return passages filled with rolling elements, and end rings covering the outer peripheral surfaces of the cage which extend axially beyond the outer sleeve, has provision for lubricating these channels while the bearing is in operation by radial excavations defined between adjacent surfaces of the outer sleeve and each end ring, the excavations communicating with an annular groove in the bore of the housing and portions of an annular groove in the outer periphery of the cage extending circumferentially between races of adjacent endless channels.

8 Claims, 4 Drawing Figures

LINEAR MOTION ROLLING BEARING

BACKGROUND OF THE INVENTION

The present invention relates to a linear motion anti-friction rolling bearing for longitudinal movements of a shaft or the like. Such a bearing includes an outer sleeve with axial races in its bore for the rolling elements under load and returned paths for the elements not under load, a cage seated in the bore with a plurality of circumferentially distributed channels consisting of axial races for the rolling elements under load and not under load and semicircular turnarounds connecting these races with each other in pairs, and rows of rolling elements arranged in these channels. There are two end rings, each covering one end of the cage radially on the outside, with the inner faces of these rings arranged in close juxtaposition to the corresponding faces of the outer sleeve.

A known bearing of this kind is furnished with lubricant such as grease at the time of assembly and/or before installation. This known bearing cannot be relubricated during operation; however such would be desirable in many cases where the bearing experiences high stresses.

To provide the possibility of additional lubrication, conventionally a radially extending aperture is formed in the wall of the outer sleeve or end ring for the rolling elements in each channel, this aperture opening directly into one of the turnarounds or races. Linear motion anti-friction rolling bearings provided with such radial apertures have the disadvantage that these apertures must be produced by a separate operation, for example by drilling or punching. Furthermore, a radial aperture in the wall of the outer sleeve or end ring must be provided for each individual channel, so that there are a comparatively large number of apertures to be made. For this reason, the known bearing is comparatively expensive to manufacture. Another disadvantage in the known bearing is its vulnerability to the danger that dirt may enter directly into the channels during transport or installation of the bearing, tending to damage or jam the rolling elements.

SUMMARY OF THE INVENTION

It is intended by the present invention to provide a linear motion rolling bearing of the kind referred to, with means for additional lubrication in the installed bearing, and protection against direct access of dirt to the channels. The bearing is also intended to be simple and economical to manufacture.

In one embodiment this objective is accomplished by providing a radial aperture between opposing faces of an end ring and the outer sleeve, this aperture leading to another passage extending circumferentially between two adjacent channels of roller elements. A recess of this type can be formed at the time the end ring and outer sleeve are formed or assembled together, without requiring any additional machining such as drilling or the like. Since the apertures do not communicate with several channels of the cage directly, but by way of a circumferential passage, the danger of fouling the bearing is to a large extent averted. Dirt particles of a size to cause trouble are stopped at the aperture or in the passage, both of which may be split construction. Also, only one or a few recessed openings need be provided to lubricate the rolling elements of all rows, because the circumferential passage is in communication with each individual channel of the cage. This construction largely prevents any penetration of dirt particles during transport or installation of the bearing.

Advantageous refinements of the invention include various possible ways of providing the self-enclosed passage in an economical manner. In one special embodiment the self-enclosed passage is formed in part by the semi-circular turnarounds at the end of the channel in question. With this construction the island segments of the cage formed between the two axial races of each channel for the loaded and nonloaded rolling elements, may be radially reinforced at their ends connected to the cage as opposed to being weakened by a circumferential lubricant passage groove in the vicinity of the island's connection to the cage body. The ends of the islands thus also form suitably high and strong shoulders securely guiding the rolling elements at the turnarounds.

An object of another embodiment is to form the radical apertures of narrow axially extending slits for relubrication of the bearing, these apertures being sufficiently narrow to prevent passage of the larger dirt particles. In another embodiment such a slit-like aperture may communicate with an annular groove on the peripheral bore surface of the outer sleeve or end ring, circumferentially distributing the lubricant. With this annular groove in the outer sleeve, no additional annular groove is needed in the bore of the housing for distribution of the lubricant at the periphery of the bearing. This annular groove provided on the periphery of the outer sleeve or end ring may also serve to accommodate fastening means such as an expansion ring.

In another embodiment the recess is a narrow split or circumferentially limited gap in the circumferential direction as opposed to the axial direction, and similarly does not admit injurious large foreign particles into the interior of the bearing.

The linear motion rolling bearing according to the invention will be illustrated in more detail by the following description of preferred embodiments represented in the drawings.

DESCRIPTION OF THE DRAWINGS AND PREFERRED EMBODIMENTS

Figure 1:
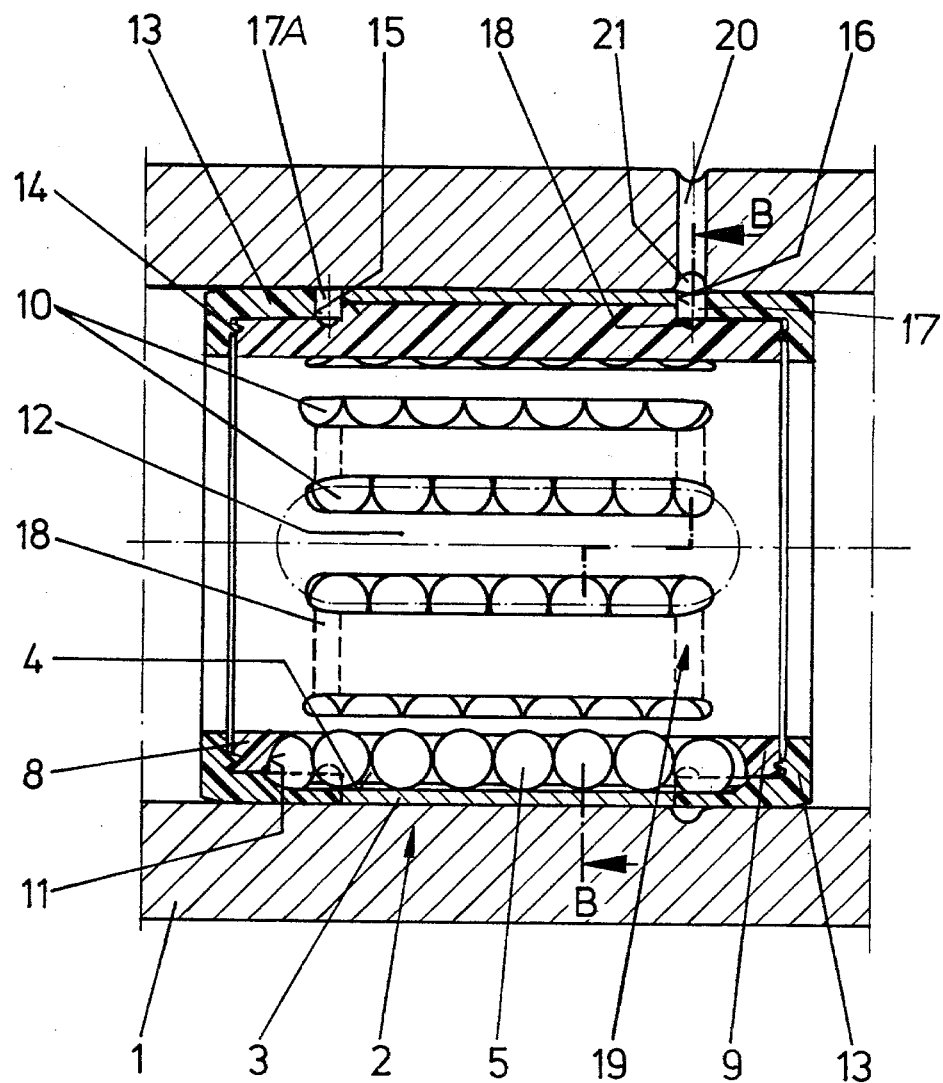
FIG. 1 shows a partial longitudinal section taken along line A—A in FIG. 2, of a linear motion rolling bearing installed in a housing.

In FIG. 1 reference number 1 designates a housing in whose bore is installed an anti-friction rolling bearing 2 for longitudinal movement of a shaft (not shown) to be inserted through the bearing 2. This bearing 2 includes an outer sleeve 3 of bearing steel or the like, provided in its bore with axial races 4 for spherical rolling elements 5 under load and return paths 6 for spherical rolling elements 7 not under load, and a sleeve-like cage 8 of synthetic material seated in said bore, its two ends 9 projecting axially beyond the outer sleeve. This cage 8 has a plurality of circumferentially distributed channels in which endless rows of rolling elements 5, 7 are arranged. Each channel of cage 8 consists of axial races 10 for loaded and non-loaded rolling elements 5 and 7 respectively of the row in question and semi-circular turnarounds 11 connecting said races 10 with each other in pairs. Between each two races 10 of a channel, web-like island segments 12 are formed, their axial end portions connected integrally with the corresponding ends 9 of cage 8.

Each end 9 of cage 8 is covered radially on the outside by an end ring 13 of synthetic material, so that the non-loaded rolling elements 7 located in the turnaround 11 of cage 8 are radially retained and guided by the corresponding end ring 13. Both the cage 8 and the two end rings 13 may be economically produced by injection molding out of a suitable synthetic material, for example POM homopolymer, and fixedly connected to each other at points 14 by ultrasonic welding, so that the outer sleeve 3 is axially fixed in cage 8 between the inner faces 15 of the two end rings 13. Thus the inner face 15 of each end ring 13 is arranged in close and tight juxtaposition to the corresponding face 16 of the outer sleeve 3.

Figure 2:
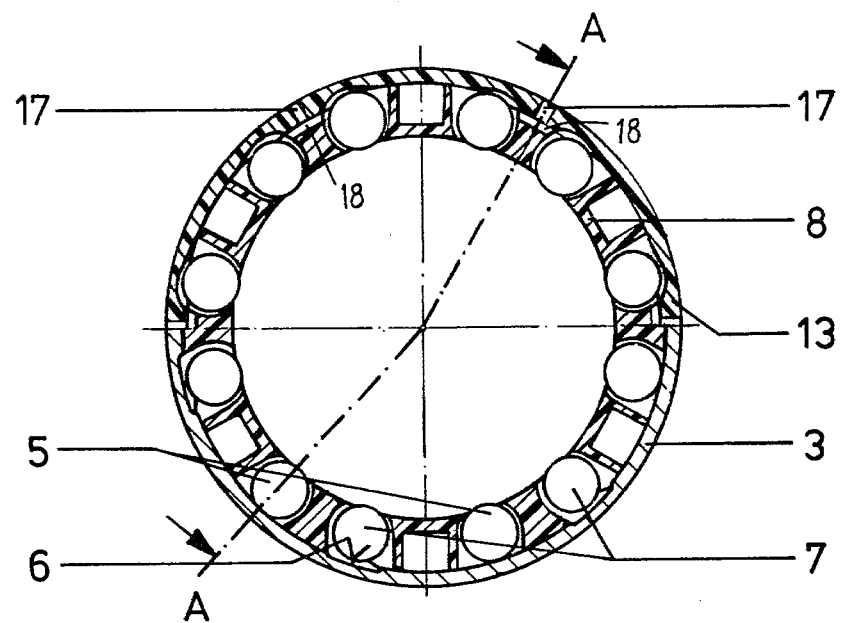
FIG. 2 shows a cross-section taken along line B—B in FIG. 1, with the housing omitted.

The linear motion bearing represented in FIGS. 1 and 2, provides a supply of lubricant such as grease, to the rolling elements 5, 7 of each row by six radial through openings 17 and 17A evenly spaced around the circumference on the inner face of each end ring 13. These openings are in the form of axial slits, each situtated between two circumferentially adjacent channels, and each opens at its radially inner end into a channel portion 18 formed by a groove-like depression in the outer peripheral surface of cage 8 extending in circumferential direction between turnarounds 11. The end ring 13 is radially outward of and covers this depression 18. Each channel portion thus connects two turnarounds 11 neighboring each other on the circumference of cage 8. These alternately spaced channel portions 18 formed between cage 8 and the corresponding end ring 13 communicate with the slit 17 and turnarounds 11, thus forming the circumferential passage 19 for distribution of the lubricant.

In the bore of the housing 1, a conventional annular groove 21 communicating with a supply passage 20 is formed and situated over the slits 17 of one of the two end rings 13 and thus conveys the lubricant to these slits. The slits 17A of the other axially opposed end ring 13 are covered and thus closed by the bore of the housing 1. The bearing is axially fixed in the bore of housing 1 by a tight fit of their adjacent peripheral surfaces, due to the elastic properties of the slitted end rings 13 formed of elastic synthetic material.

Figure 3:
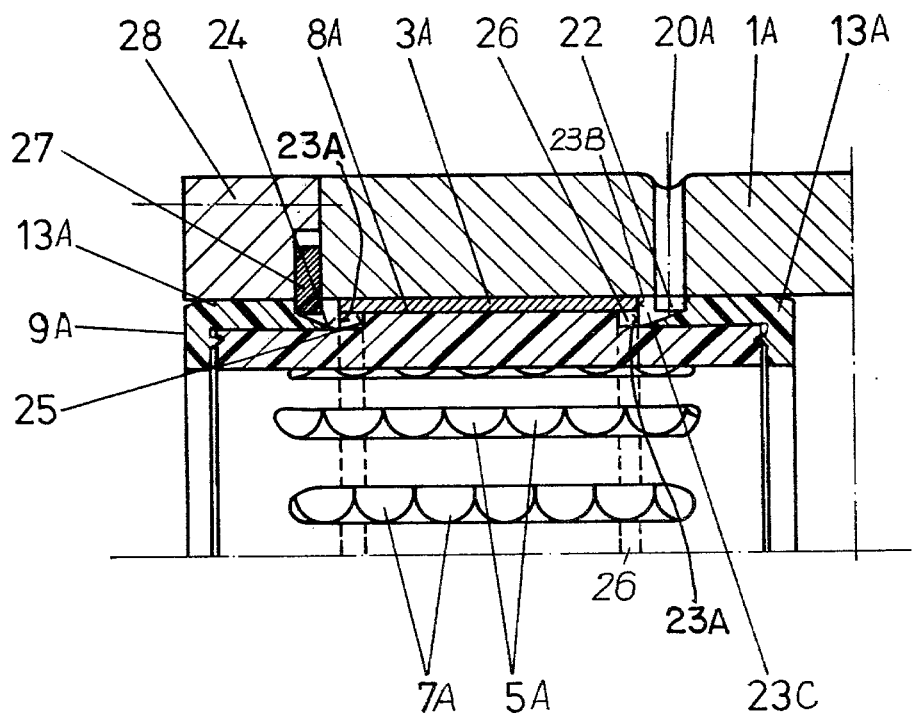
FIG. 3 shows a partial longitudinal section of a modified linear motion rolling bearing installed in a housing.

FIG. 3 shows a modified linear motion rolling bearing installed in the bore of a housing 1A. This bearing is similar in construction to the bearing shown in FIGS. 1 and 2 with loaded balls 5A and unloaded balls 7A. It likewise consists of an outer sleeve 3A, a cage 8A seated in the bore of the outer sleeve 3A with ends 9A axially projecting beyond the ends of the outer sleeve 3A, and two end rings 13A, each covering one end of cage 8A radially on the outside. On the outer peripheral surface of each end ring 13A an annular groove 22 is formed. Also each end ring 13A has recesses 23C on its inner axial 23A face, closely justaposed to the corresponding face 23B of outer sleeve 3A, which recesses are in the form of sufficiently narrow axial slits that do not allow passage of large dirt particles. These recesses 23C open into the annular groove 22 extending circumferentially around the end ring.

Each slit 23C in this case has a bottom surface 24 sloped radially inward toward the inner face 23A of the corresponding end ring 13A. Between the inner face 23A of end ring 13A and a shoulder 25 of cage 8A adjacent and axially spaced therefrom, a self-enclosed annular passage 26 is formed and covered radially from the outside by the outer sleeve 3A.

This passage 26 is in communication with every single channel of rolling elements of cage 8A.

To supply lubricant a supply hole 20A is formed in the housing 1A over the annular groove 22 of the end ring 13A at the right in FIG. 3. In the annular groove 22 of the lefthand end ring 13A, an expansion ring 27 is seated as a means of fastening the bearing in housing 1A. This fastening ring is fixed to the housing by means of a cover ring 28, which may be connected to the housing by screws or the like.

Figure 4:
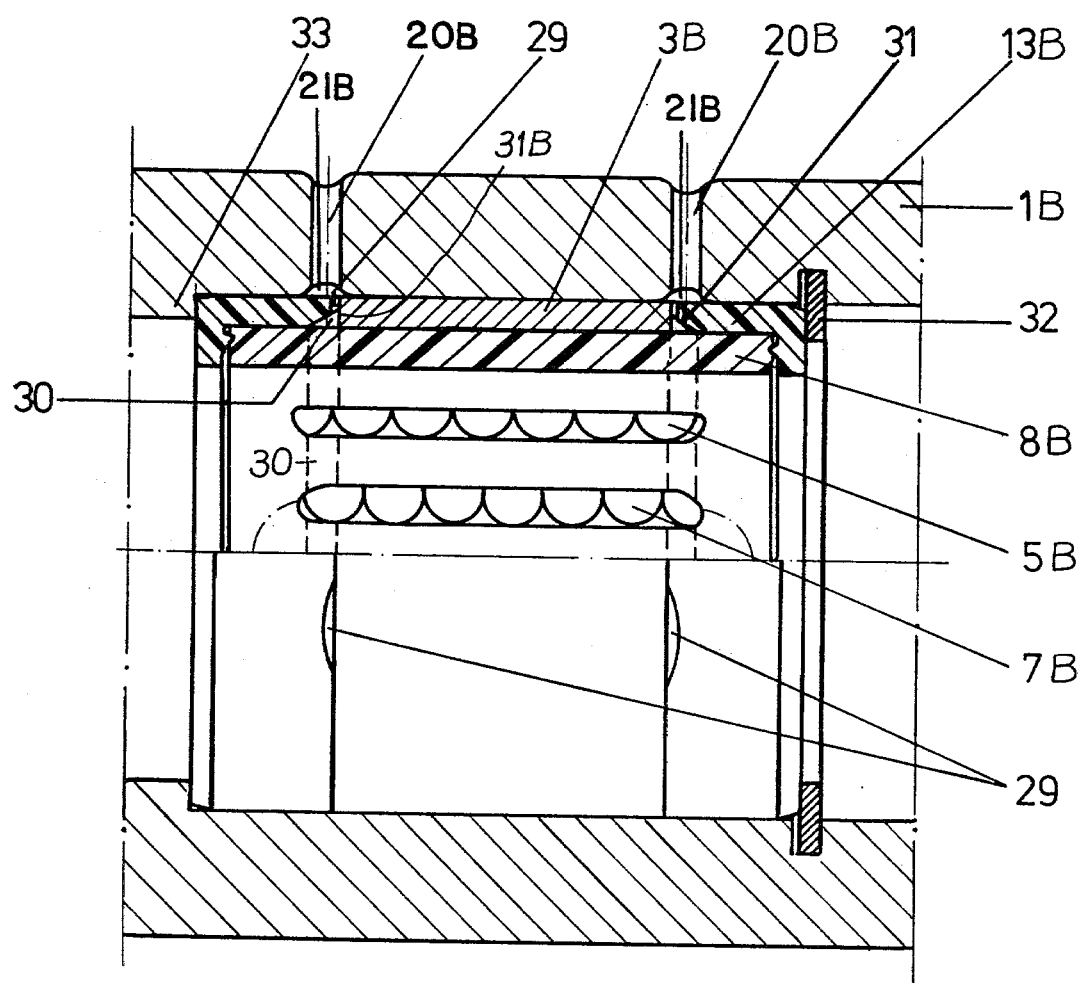
FIG. 4 shows a partial longitudinal section of another modified linear motion rolling bearing installed in a housing.

FIG. 4 shows another modified linear motion rolling bearing, which by contrast with the bearing previously described, has three circumferentially distributed recesses on the inner face of each end ring 13B. Each of these recesses has the form of a flat, radially extending excavation 29 formed into one of the opposing faces of the sleeve 3B and an outer ring 13B, and forming a narrow circumferentially limited gap between these faces. Due to the comparatively small number of excavations 29 on the periphery of the end ring 13B and the narrowness of these excavations, the danger of fouling of the bearing by small dirt particles is largely averted.

Each excavation 29 is arranged between two circumferentially neighboring channels and opens into an annular self-enclosed passage 30 formed by a peripheral chamfer 31 on the radially inner edges of the inner face of each of the end rings. Each chamfer is bounded radially inward by the outer peripheral surface of cage 8B and bounded axially by the face 31B of outer sleeve axially opposed to the chamfer 31.

Annular grooves 21B are formed in housing 1B radially outward and over the three recesses 29 of the two end rings 13B, whereby the lubricant arriving from supply passages 20B is circumferentially distributed and supplied to the several recesses 29. The lubricant passes by way of recesses 29 into the annular passage 30 which is in communication with each of the six channels of cage 8B. The lubricant is thus distributed evenly to each row of rolling elements. The bearing is axially fixed by the expansion ring 32 on one side in the bore of the housing and by a shoulder 33 on the other side.

The linear motion rolling bearing according to the invention has the great advantage of providing means for added lubrication of the installed bearing, while at the same time the bearing is protected against direct entry of dirt into the channels of the cage.

Within the spirit of the invention this linear motion rolling bearing may be modified in a variety of ways. For example, the recesses need not be formed in the inner face of one or both end rings, but instead may be provided on the outer sleeve face closely juxtaposed to that face, between two circumferentially neighboring channels. In that case, of course, the recesses must be formed or machined into the outer ring which is normally of a hard material such as steel. Producing the openings in this way is more expensive.

Alternatively, the recesses present between two circumferentially neighboring channels need not be formed on one of the two closely juxtaposed faces of end ring and outer sleeve, but may be so arranged on both faces that they correspond axially or in a staggered arrangement on the circumference. In another version the circumferential or annular passage between an end ring and the cage may be formed solely by an annular groove formed in the outer peripheral surface of the cage and covered radially on the outside by the corresponding end ring.

Finally, the annular groove shown in FIG. 3 need not be formed in the peripheral surface of the end ring; instead, if axial excavations are formed in the face of the end ring, the annular groove may also be provided in the peripheral surface of the outer sleeve both for circumferential distribution of lubricant and accommodation of fastening means, for example, snap rings, for the bearing in its housing.

What is claimed is:

1. In a linear motion rolling bearing including an outer sleeve with outer end faces and a bore, a cage seated in said bore with a plurality of circumferentially distributed endless channels, a plurality of rolling elements in said channels, each channel being comprised of axial races for the rolling elements under load and not under respectively, semicircular turnarounds connecting said races with each other in pairs, a plurality of rolling elements filling said channels, and two end rings, each covering one end of the cage radially on the outside and each having an inner end closely adjacent one of the corresponding outer end faces of the outer sleeve, the improvement of lubricant supply means for the rolling elements in said channels comprising at least one aperture extending radially inward and defined by a recess in at least one of said adjacent end faces of said outer sleeve and one end ring, said improvement further comprising a passage extending circumferentially between each two adjacent endless channels and formed between the outer periphery of the cage and the adjacent outer surface of at least one of the outer sleeve and end ring elements, said aperture communicating with said passage and thence with the endless channels that said passage extends between.

2. A bearing according to claim 1, wherein said circumferentially extending passage is defined by an annular groove formed in the outer peripheral surface of the cage, said groove being covered and closed by an inner peripheral surface of an adjacent end ring.

3. A bearing according to claim 1, wherein said circumferential passage is defined by an annular shoulder of the cage spaced a distance from the inner face of the adjacent end ring and closed off radially on the outside by the outer sleeve.

4. A bearing according to claim 1, wherein said circumferential passage is defined by a peripheral chamfer facing radially outward on the inner edge of the inner face of an end ring spaced slightly from the outer peripheral surface of said cage and also spaced slightly from an outer end face of the outer sleeve.

5. A bearing according to claim 1, wherein said circumferential passage comprises said turnarounds and said adjacent passage portions connecting turnarounds of adjacent channels.

6. A bearing according to claim 1, wherein said recess has the form of an axial recess.

7. A bearing according to claim 6, wherein said recess extending radially inward opens into an annular groove provided in an adjacent outer peripheral surface of one of said end ring and outer sleeve elements.

8. A bearing according to claim 1, wherein said recess has the form of a flat recess extending radially outward.

* * * * *

UNITED STATES PATENT AND TRADEMARK OFFICE
CERTIFICATE OF CORRECTION

PATENT NO. : 4,339,157
DATED : July 13, 1982
INVENTOR(S) : Olschewski et al.

It is certified that error appears in the above—identified patent and that said Letters Patent is hereby corrected as shown below:

Column 3, line 18 omit "in" and substitute --on--.

Signed and Sealed this

Third Day of May 1983

[SEAL]

Attest:

GERALD J. MOSSINGHOFF

Attesting Officer

Commissioner of Patents and Trademarks